Nov. 12, 1957     G. E. BRIGGS     2,812,607
BIIMAGE

Filed Nov. 21, 1956     2 Sheets-Sheet 1

INVENTOR.
GEORGE E. BRIGGS
BY
ATTORNEYS

Nov. 12, 1957 G. E. BRIGGS 2,812,607
BIIMAGE
Filed Nov. 21, 1956 2 Sheets-Sheet 2
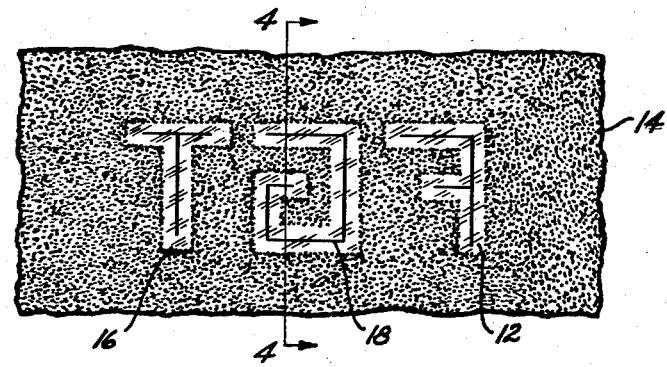
FIG. 3
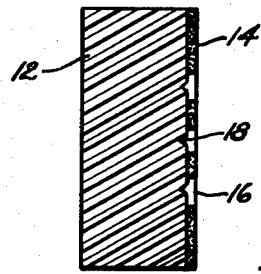
FIG. 4
FIG. 5
FIG. 6
FIG. 7
INVENTOR.
GEORGE E. BRIGGS
BY Wade Koontz
Arnold H. Cole
ATTORNEYS United States Patent Office 2,812,607
Patented Nov. 12, 1957

2,812,607

BIIMAGE

George E. Briggs, Danvers, Mass.

Application November 21, 1956, Serial No. 623,720

8 Claims. (Cl. 40—130)

(Granted under Title 35, U. S. Code (1952), sec. 266)

The invention described herein may be manufactured and used by or for the United States Government for governmental purposes without payment to me of any royalty thereon.

This invention relates to the field of illumination, and is more particularly concerned with a means for selectively illuminating a plurality of superimposed images.

There are many instances where a pair of images are related in such a manner that it is desirable to have only one or the other of said pair readily visible to an observer. In general, this might be true in advertising signs, toys or games, and data indicating devices. A more specific example might be the target indicating panel of a radar interrogating device. In said device, when an object is discovered, the nature of such object must be made known to the operator. The latter has before him a list of possible identities, one of which covers said object, and the interrogating device indicates to said operator which of the listed identities fits.

Heretofore, the list has either been printed on the panel in the form of signs or said list has been arranged on the panel for permanent illumination. In both cases the means for identifying comprises a separate list of identities, one of which is illuminated when the device has classified the unknown object. Either method requires the expenditure of space in duplicating the lists. The former also presents a problem in regard to visibility of the signs in a dark or semi-dark room, while the latter necessitates the use of extra materials for the above noted permanent illumination.

Accordingly, it is a primary object of my invention to provide a new and improved means for illuminating a pair of images.

Another object of my invention is to provide such means which will permit selective illumination of said images.

Still another object of my invention is to combine the principles of back and edge lighting to produce a more compact illuminating arrangement which is both simple and inexpensive to employ.

The above and still further objects, advantages, and features of the invention will become apparent upon consideration of the following detailed description thereof, especially when taken in conjunction with the accompanying drawings, wherein:

Figure 3 is a partial elevational view taken from the rear of the panel;

Figure 4 is a section on the line 4—4 of Figure 3;

Figure 5 shows an arrangement for a pair of dissimilar images; and

Figures 6 and 7 show the manner in which said dissimilar images appear when edge lit and back lit respectively.

Turning now to the drawings in which like characters of reference indicate like parts, a target indicating panel embodying my invention is shown generally at 10. The front portion of said panel comprises a sheet of light conducting thermoplastic 12 such as Plexiglas, Lucite or the like.

Figure 2:
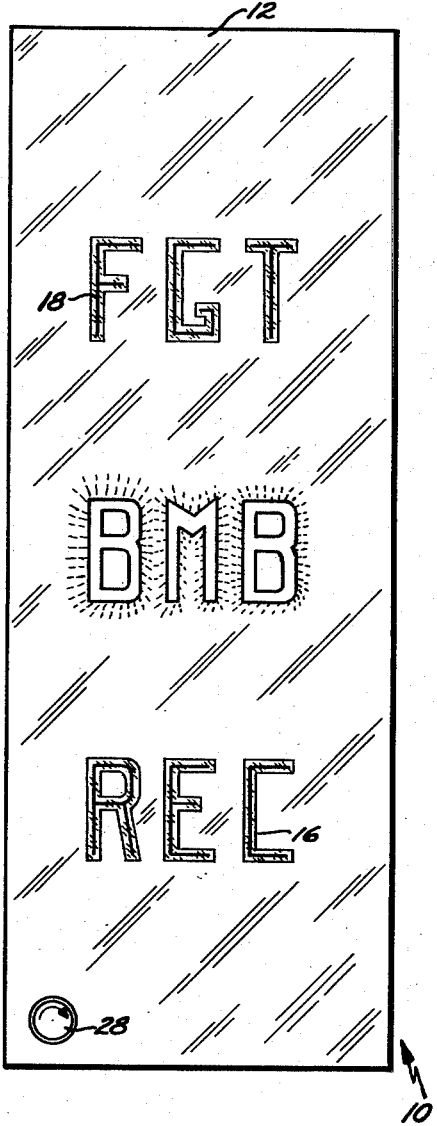
Figure 2 is a front elevation of the panel shown in Figure 1.

In the specific embodiment illustrated, three pairs of images are employed. Actually, there is no limit to the number of pairs which may be used. The pairs seen in Figures 2 and 3 represent various types of aircraft which may be detected, and which the interrogating device may identify.

Each pair of images consists of one double line image and one single line image superimposed on the former. The double line image is formed on the rear face of the sheet 12 by the silk screening process, the letters being clear while the remainder of said sheet is coated. The coating is shown at 14, and its thickness has been greatly exaggerated in Figures 2 and 4 for the purposes of clarity. The image should be as wide as possible without distortion. In the case of words, the letters should also be as wide as possible, the limiting factor being the type of print used. The coating or screen on the rear of the sheet 12 must be opaque. Aside from silk screening, this may be accomplished by using a line negative stripping film, placing a negative between two sheets of plastic, or by photo etching a metal laminate on said sheet.

With the double line image formed as described above, the single line is then engraved centrally thereof. This can be best seen in Figure 3 wherein the screened word is indicated at 16 and the engraved word at 18. If desired, the images may be formed on the front face of the panel 10.

A metal plate 20 is secured to the rear face of the sheet 12 by any suitable means. Said plate serves as both a backing for the screened surface and a template for mounting the several illuminating means. A series of openings 22 and grooves 24 in said plate perform the latter function. The grooves 24 accommodate a plurality of small lamps 26. Such lamps are also partially embedded in the plastic sheet 12 and provide the edge lighting. A rheostat 28 which is controlled from the front of the panel is connected to vary the intensity of the lamps 26 for a purpose hereinafter explained.

The back lighting structure includes a series of blocks 30 of light conducting thermoplastic. The blocks 30 pass through the openings 22 in the plate 20 and abut the rear face of the opaque coating 14. The positioning of said openings, and accordingly of said blocks, is such that each block 30 overlies one pair of images. Supporting angle brackets 32 may be mounted on the plate 20 adjacent said blocks.

Mounted on the end of each block 30 furthest from the images is a lamp 34, preferably of the neon type. Light holders 36 are mounted on said blocks 30 and serve to inclose lamps 34. With said lamps mounted externally of said blocks, the front edge of each block which contacts said opaque coating 14 is flat, and the surface of this edge of said blocks is roughened to act as a diffusion material for the light emitted by the lamps 34. Such roughening may be accomplished by mounting all of the blocks 30 in the metal backing sheet 20 and then sand blasting. The pitting of the block surfaces by the sand aids in producing an even intensity of light along such surfaces. Under certain circumstances it may be more desirable to embed the back lights in the blocks 30. All other edges of said blocks are coated with a light reflecting paint such as silver or aluminum. In this manner loss of light is prevented, and a maximum intensity is achieved at the front of the panel.

Figure 1:
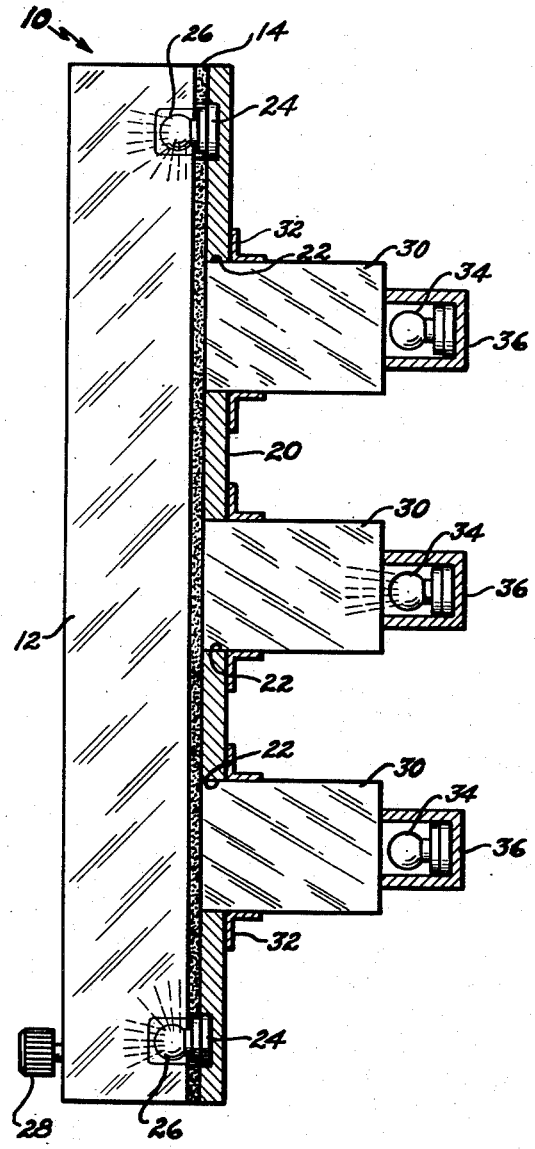
Figure 1 is a partially schematic side elevation showing a panel employing the biimage principle.

With the device assembled as shown in Figures 1 and 2, the lamps 26 are connected in a single circuit. The rheostat 28 is also in said circuit. Depending upon the light conditions in the room where the device is being used—dark, semi-dark or fully lit—the intensity of the lamps 26 is adjusted through said rheostat. The lamps 34 each have a separate circuit so that independent operation is possible. Such circuits are connected to the interrogating device, and are closed to provide back lighting of the image corresponding to the object identified.

Of the three pairs of images on the panel in Figure 2, it will be noted that only the single line image 18 is clearly visible in the words FGT and REC. In the third word, BMB, the single line image is substantially invisible to the observer. This is caused by the intensity of the back light being greater than the intensity of the edge light to the extent that the image 18 is effectively obliterated and lost. Only the double line image shows brightly since the interrogating device has closed the circuit to the lamp 34 in the block 30 behind the latter word. Thus, it is readily apparent to an observer that the object being interrogated is a bomber. Had either of the other words been back lit, the observer would know the object to be a fighter or a reconnaissance plane.

While the image pairs described above have all been identical words, my invention may also be used in other fashions. For example, Figures 5, 6, and 7 show the manner in which a single biimage may be employed to indicate alternative weather conditions. The double line image in this instance is made considerably larger than the single line image. The latter is engraved within the former as shown in Figure 5. With only edge lighting, the word CLEAR will appear as in Figure 6, the Y in CLOUDY not being lit since there is no engraved image therein. When the back lamp is lit, the smaller image is overshadowed, and only CLOUDY is visible, see Figure 7.

It is to be understood that the above-described arrangements are merely illustrative of the applications of the principles of my invention. Numerous other arrangements may be devised by those skilled in the art without departing from the spirit and scope of the invention.

What is claimed is:

1. In a device of the class described, the combination comprising a sheet of light conducting thermoplastic, first image means formed on said sheet, second image means formed on said sheet and closely associated with said first image means, a first light means for constantly illuminating said first image means, and second light means associated with both said image means whereby operation of said second light means will illuminate said second image means while obliterating said first image means.

2. In a device of the class described, the combination comprising a light conducting plastic member, constantly operating edge lighting means on said member, back lighting means on said member, a relatively wide image means formed on one face of said member, second image means formed on said member within the confines of said wide image means, said back lighting means being positioned to overlie said wide image means whereby said edge lighting means illuminates said second image means and is substantially obliterated when said wide image means is illuminated by operation of said back lighting means.

3. An illuminating device comprising a member of light conducting thermoplastic, a first image formed on one face of said member, the remainder of said face being opaquely coated, an intaglio image formed on said face within said first image, edge lights on said member for illuminating said intaglio image, and back lighting means on said member for concurrently illuminating said first image and obliterating said intaglio image.

4. A device as defined in claim 3 wherein said back lighting means include a plastic block mounted on said member face and overlying said images, a lamp associated with the face of said block furthest from said member, and coating means on said block for directing the light of said lamp only toward said member.

5. A device as defined in claim 4 wherein said edge lights are partially embedded in said member, and a template means backing said face of the plastic member, said last-named means having portions arranged to accommodate said edge lights and said plastic block.

6. A device as defined in claim 3 wherein a rheostat is provided to control said edge lights whereby the intensity of their illumination may be varied, as needed.

7. A device of the class described comprising a sheet of light conducting thermoplastic, an intaglio image formed on one face of said sheet, a relativiely wider image on said face surrounding said intaglio image, an opaque coating on the rest of said face, a plurality of constantly lit lamps mounted on an edge of said sheet, a plastic block carried by said face and covering both said images, a back lamp connected to said block, and means associated with said back lamp and said block for directing light of said lamp only toward said images.

8. A device as defined in claim 7 including means on said sheet for varying the intensity of said constantly lit lamps, and means between said plastic block and said face for producing an even intensity of back light.

No references cited.